US012069982B2

(12) United States Patent
Radeke

(10) Patent No.: US 12,069,982 B2
(45) Date of Patent: Aug. 27, 2024

(54) METERING UNIT FOR GRANULAR MATERIAL

(71) Applicant: Amazonen-Werke H. Dreyer GmbH & Co. KG, Hasbergen (DE)

(72) Inventor: Jan Philipp Radeke, Bassum (DE)

(73) Assignee: Amazonen-Werke H. Dreyer SE & Co. KG (DE)

( * ) Notice: Subject to any disclaimer, the term of this patent is extended or adjusted under 35 U.S.C. 154(b) by 827 days.

(21) Appl. No.: 17/269,032

(22) PCT Filed: Aug. 5, 2019

(86) PCT No.: PCT/EP2019/070970
§ 371 (c)(1),
(2) Date: Feb. 17, 2021

(87) PCT Pub. No.: WO2020/035339
PCT Pub. Date: Feb. 20, 2020

(65) Prior Publication Data
US 2021/0176913 A1 Jun. 17, 2021

(30) Foreign Application Priority Data
Aug. 17, 2018 (DE) .................... 10 2018 120 071.4

(51) Int. Cl.
*A01C 7/12* (2006.01)
(52) U.S. Cl.
CPC .................... *A01C 7/125* (2013.01)

(58) Field of Classification Search
CPC .......... A01C 7/125; A01C 7/123; A01C 7/12; A01C 7/08; A01C 7/00
See application file for complete search history.

(56) References Cited

U.S. PATENT DOCUMENTS

2012/0174844 A1  7/2012  Friggstad

FOREIGN PATENT DOCUMENTS

| DE | 10 2008 013 162 A1 | 9/2009 |
| EP | 2 832 202 A1 | 2/2015 |

OTHER PUBLICATIONS

International Search Report for International Patent Application No. PCT/EP2019/070970, mailed Oct. 30, 2019.

*Primary Examiner* — Christopher J. Novosad
(74) *Attorney, Agent, or Firm* — Mintz Levin Cohn Ferris Glovsky and Popeo, P.C.

(57) ABSTRACT

A metering unit for granular material, such as seed or fertilizer, is arranged to convey the granular material in adjustable quantities, where the metering unit includes a metering housing and a drivable metering wheel rotatably supported in the metering housing, where, for rotatably supporting the metering wheel, the metering unit includes a bearing housing and a metering cover which is movable to various positions. For reliably securing the bearing housing in position, the metering cover includes a nose-piece-like extension and the extension defines an abutment for the bearing housing.

Figure 1:
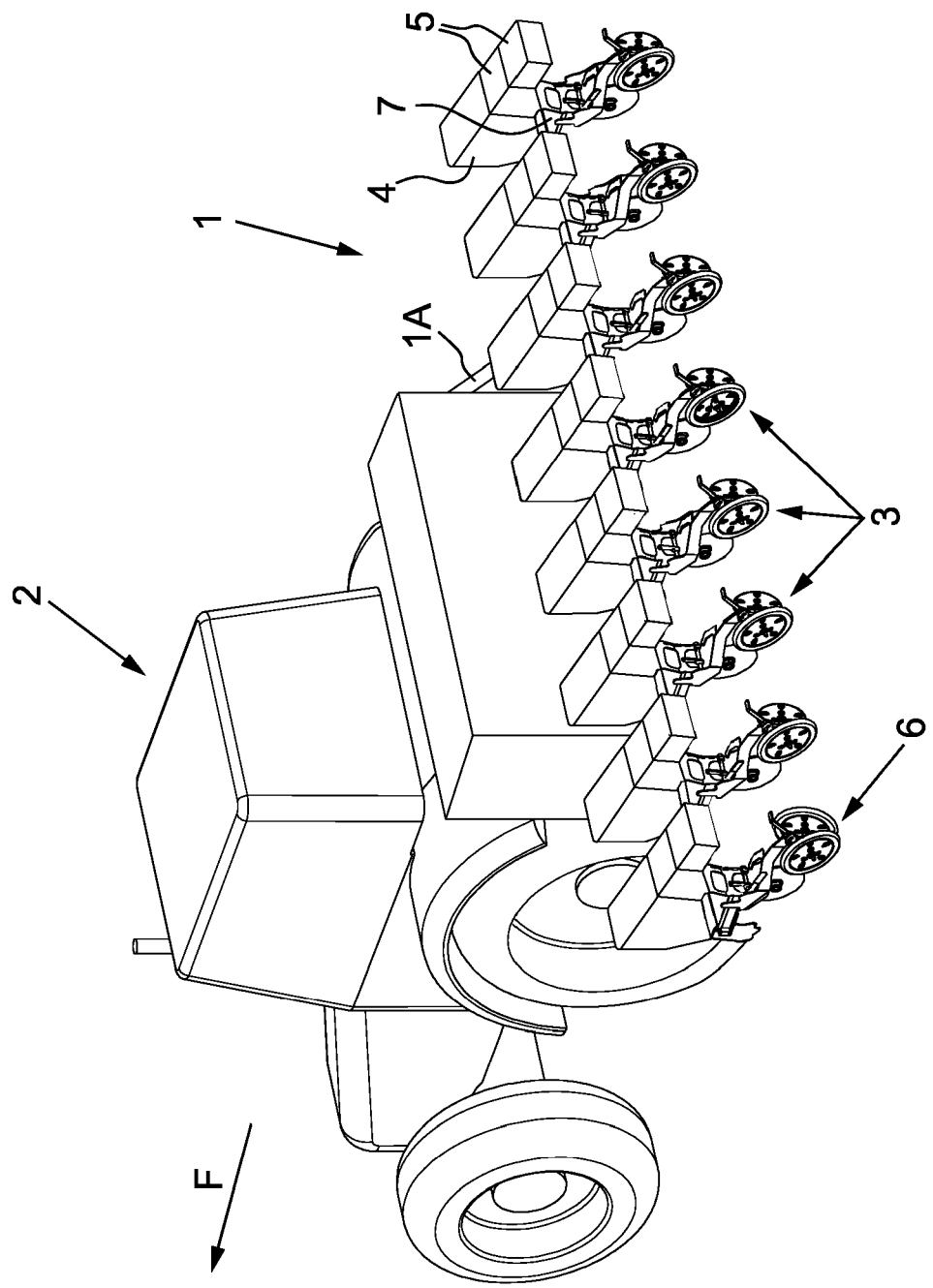

3 Claims, 9 Drawing Sheets

METERING UNIT FOR GRANULAR MATERIAL

The present invention relates to a metering unit for granular material and to an agricultural distributing machine.

A distributing machine for distributing seed, fertilizer or the like is known from reference EP 2 832 202 B1. This distributing machine comprises a storage container with a plurality of metering units for granular material, a metering unit being configured for conveying the granular material in adjustable quantities. For this purpose, the respective metering unit comprises a metering housing. The metering housing has arranged therein a rotatably supported metering wheel. In operation, the metering wheel is caused to rotate by a drive, so that granular material is conveyed by means of the metering wheel. In addition, the metering unit comprises a shut-off valve that is adapted to be displaced to various positions. The shut-off valve can thus be displaced to various positions, thus opening a desired opening cross-section through which granular material can flow into the metering housing. Hence, the shut-off valve has to be opened for operation so that granular material can flow-in continuously. If operation does not take place, the shut-off valve has to be displaced to such an extent that the opening cross-section is closed, so as to prevent undesired discharge of the granular material from the storage container to the metering wheel.

This metering unit comprises devices for rotatably supporting the metering wheel. When the metering unit is in operation, a differential torque occurs between the force input and force output side of the metering wheel, which must be absorbed and dissipated in a suitable manner. In this metering unit, a form-fit connection by means of a groove is provided for this purpose at the devices which are used for the purpose of rotatably supporting and which are difficult to access in any case. This complicated structural design makes initial assembly and maintenance more difficult.

Hence, the task underlying the present invention is to provide of a metering unit, which is used for an agricultural distributing machine and which has a simplified bearing for the metering wheel.

According to the present invention this task is solved in that, for rotatably supporting the metering wheel, the metering unit includes a bearing housing, that the bearing housing comprises a locked position, at which the bearing housing is secured in position on the metering housing in an axial direction, and an unlocked position, at which the bearing housing is removable from the metering housing, that the bearing housing is adapted to be rotated between the locked position and the unlocked position, that the metering housing includes a metering cover which is movable to various positions, that the metering cover comprises a first position protecting the metering wheel and a second position uncovering the metering wheel, that the metering cover includes an extension, preferably a nose-piece-like extension, that, at the first position of the metering cover, the extension defines an abutment for the bearing housing and is adapted to block a rotary movement of the bearing housing from the locked position to the unlocked position.

As a result of this measure, the metering device is provided with a particularly easily accessible bearing. In addition, the groove for establishing a form-fit connection is no longer necessary, since the bearing housing rests on the metering cover by means of the abutment. Differential torques occurring at the bearing housing during operation are absorbed in a simple manner by the bearing housing and dissipated to the metering cover. Hence, the metering unit according to the present invention is characterized by a particularly simple and safe structural design.

In addition, an advantageous further development of the metering unit according to the present invention is that the metering cover is arranged on the metering housing by means of a pivot joint having a pivot axis, that the metering cover is movable between the first and the second position by means of the pivot joint. An advantage achieved in this connection is that the metering cover is undetachably arranged on the metering housing. This means that, even when work is carried out on the interior of the metering housing, the metering cover will be fixed to the metering housing and need not be retained with special care nor can it be damaged by falling down.

According to another advantageous further development of the present invention, the metering cover includes a lug on the side facing the shut-off valve, the metering cover having assigned thereto a locking device, by means of which the metering cover is secured at the first position, and the locking device comprises a locking element, which is adapted to be pushed away and which is configured for establishing a releasable, form-fit connection with the lug of the metering cover at the first position of the metering cover, the shut-off valve being arranged behind the locking device in the push-away direction of the locking element and having a reception unit for the locking element, the shut-off valve being, by means of the reception unit, configured for allowing and/or blocking the pushing away of the locking element.

As a result of this measure, the metering unit is configured with two successive safety steps, so that the protection for the user during handling is increased in an excellent manner. The first safety step is defined by the locking device, without an actuation of which the interior of the metering housing is not accessible to the user. This locking device is additionally secured through the position of the shut-off valve, which defines the second safety step.

The shut-off valve with its reception unit for the locking element is arranged behind the locking device such that the locking element can be displaced into the reception unit, in particular by pushing it away. The reception unit on the shut-off valve is arranged such that the locking element can only be displaced into the reception unit, if the shut-off valve is located at its closed position. As soon as the shut-off valve has been displaced to an at least partially open position, the reception unit is no longer in alignment with the locking element so that the displaceability of the locking element is blocked. This means that, during operation of the metering unit, the interior of the metering housing is no longer accessible to the user, since an actuation of the locking device is already prevented by the open position of the shut-off valve and the metering cover is thus secured at its first position protecting the metering wheel.

It follows that, for opening the metering housing, it will be necessary to displace the shut-off valve to the closed position, so as to allow the displaceability of the locking element. The metering unit is typically not in operation when the shut-off valve is closed, so that it will be safe for the user to open the metering cover without coming into contact with the driven metering wheel.

According to an advantageous further development of the present invention, the metering housing comprises a first stop for limiting the rotary movement of the bearing housing from the unlocked position to the locked position, the extension defining, at the first position of the metering cover, a second stop, which is preferably located opposite the first stop, and the bearing housing being adapted to be secured in position on the metering housing in a rotationally fixed manner between the first stop and the second stop. It follows that the bearing housing is not only secured in position on the metering housing in an axial direction, but is also held between the first stop and the second stop at the locked position that is safe for operation. In an advantageous manner, the first stop serves here to limit the mounting movement of the bearing housing.

The task underlying the present invention is additionally solved by an agricultural distributing machine of the type referred to at the beginning, the agricultural distributing machine including at least one storage container for seed, fertilizer or the like, and the storage container having assigned thereto at least one metering unit, the metering unit being configured according to at least one of the preceding embodiments.

Figure 2:
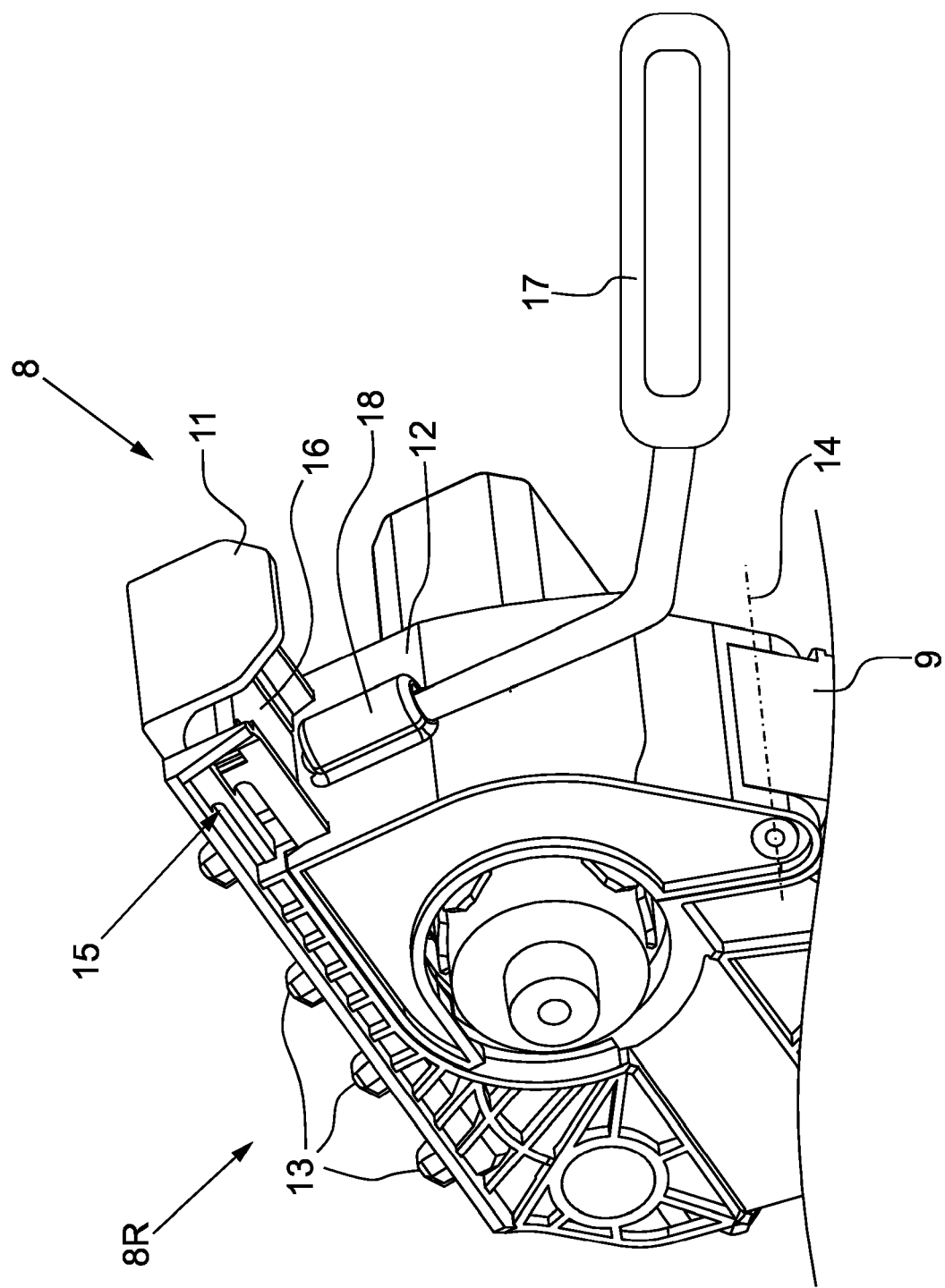
Figure 3:
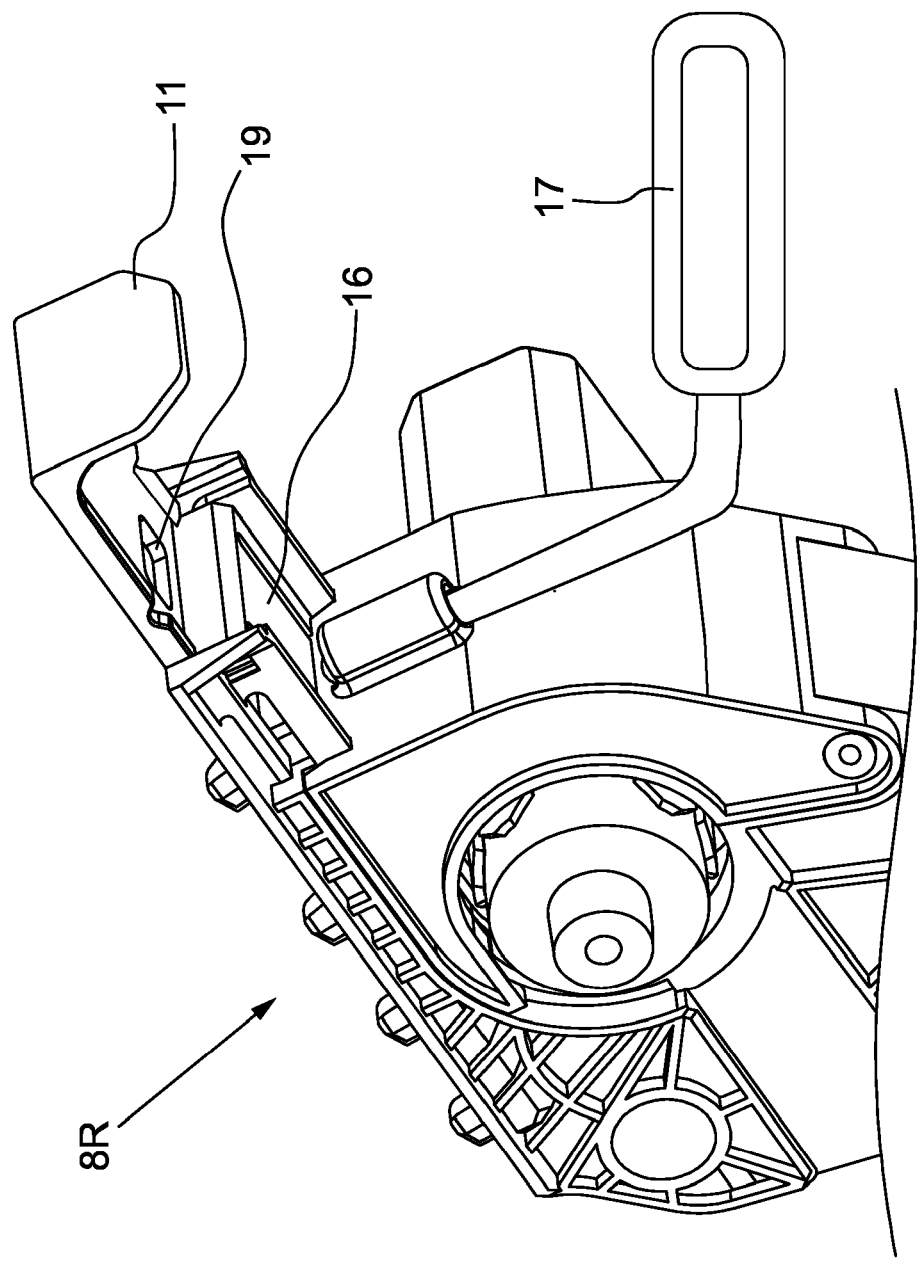
Figure 4:
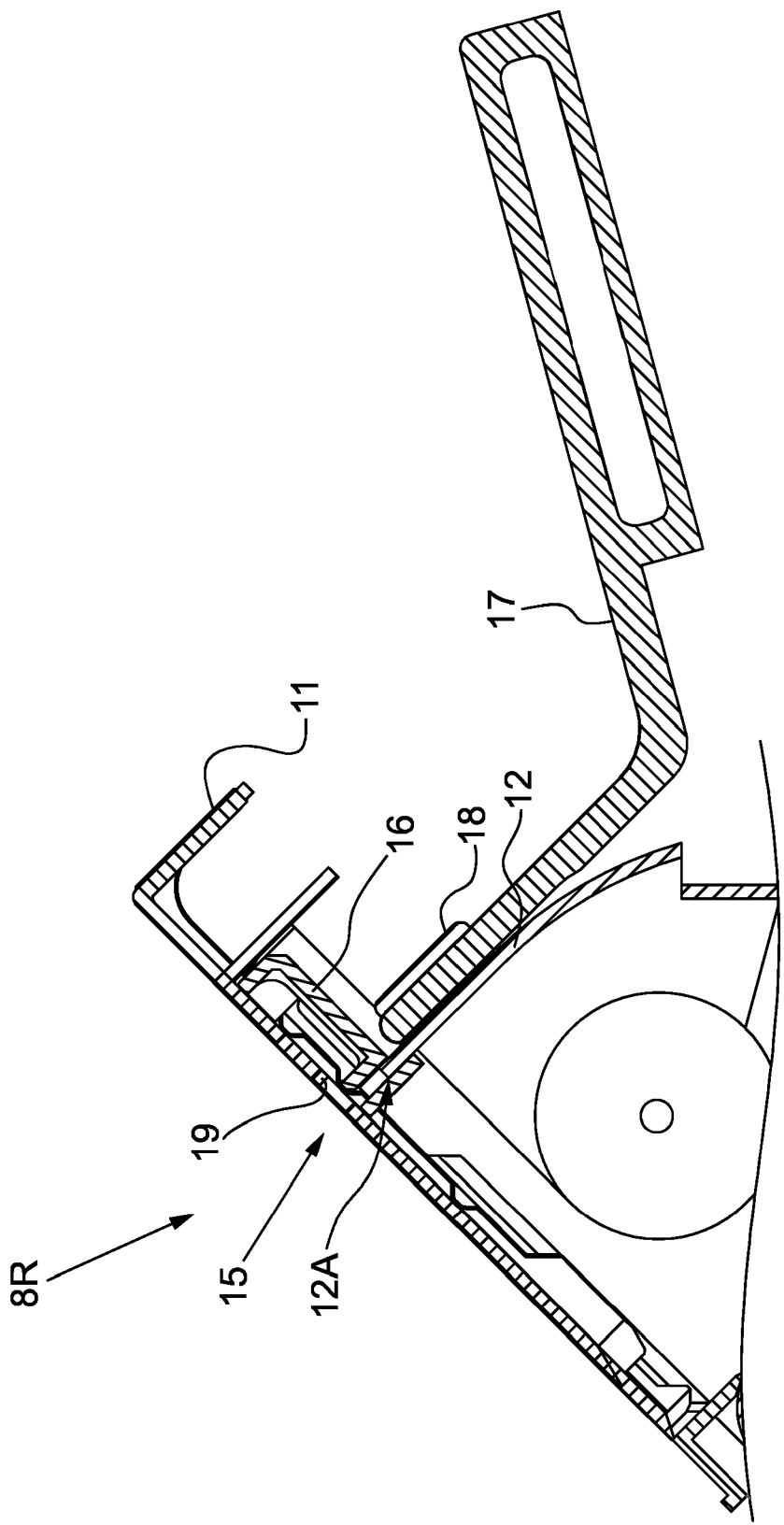
Figure 5:
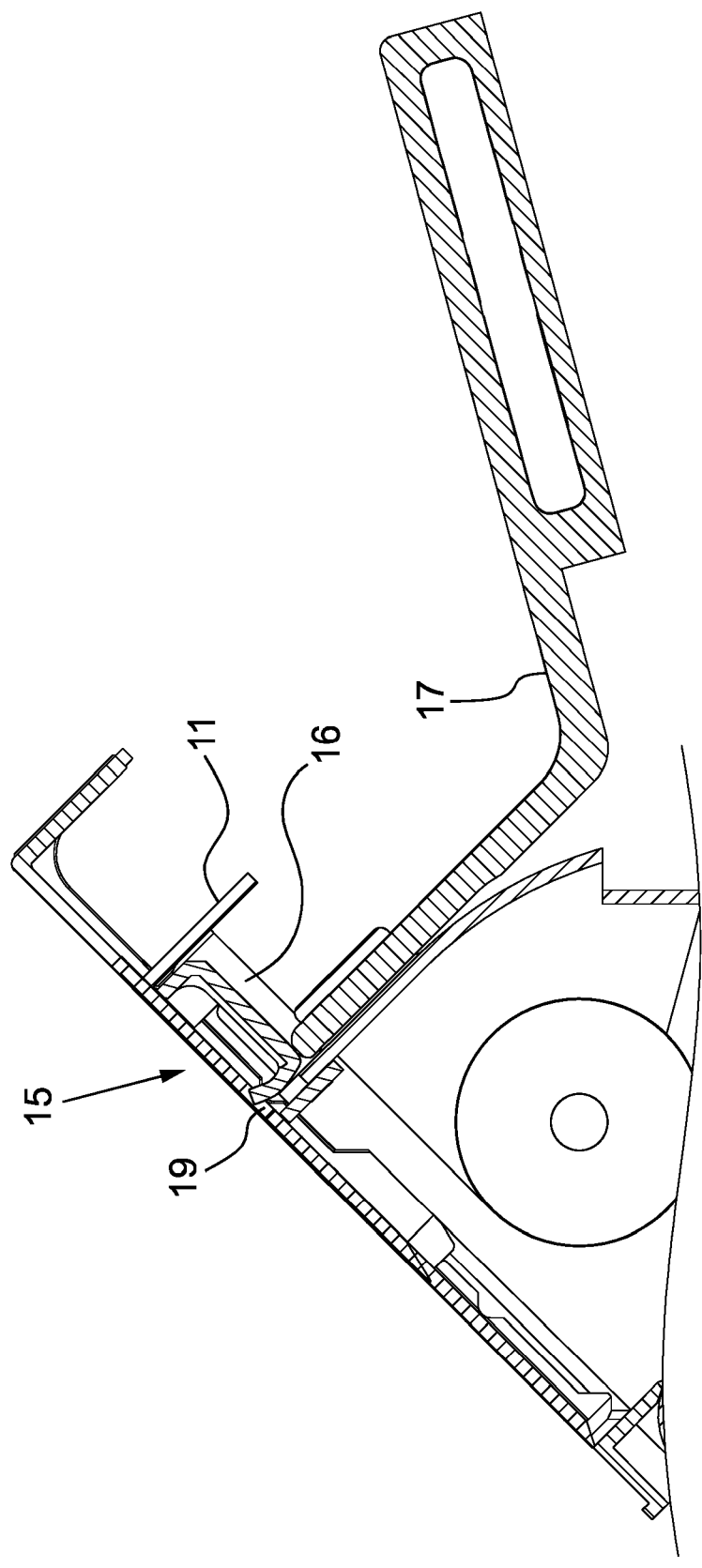
Figure 6:
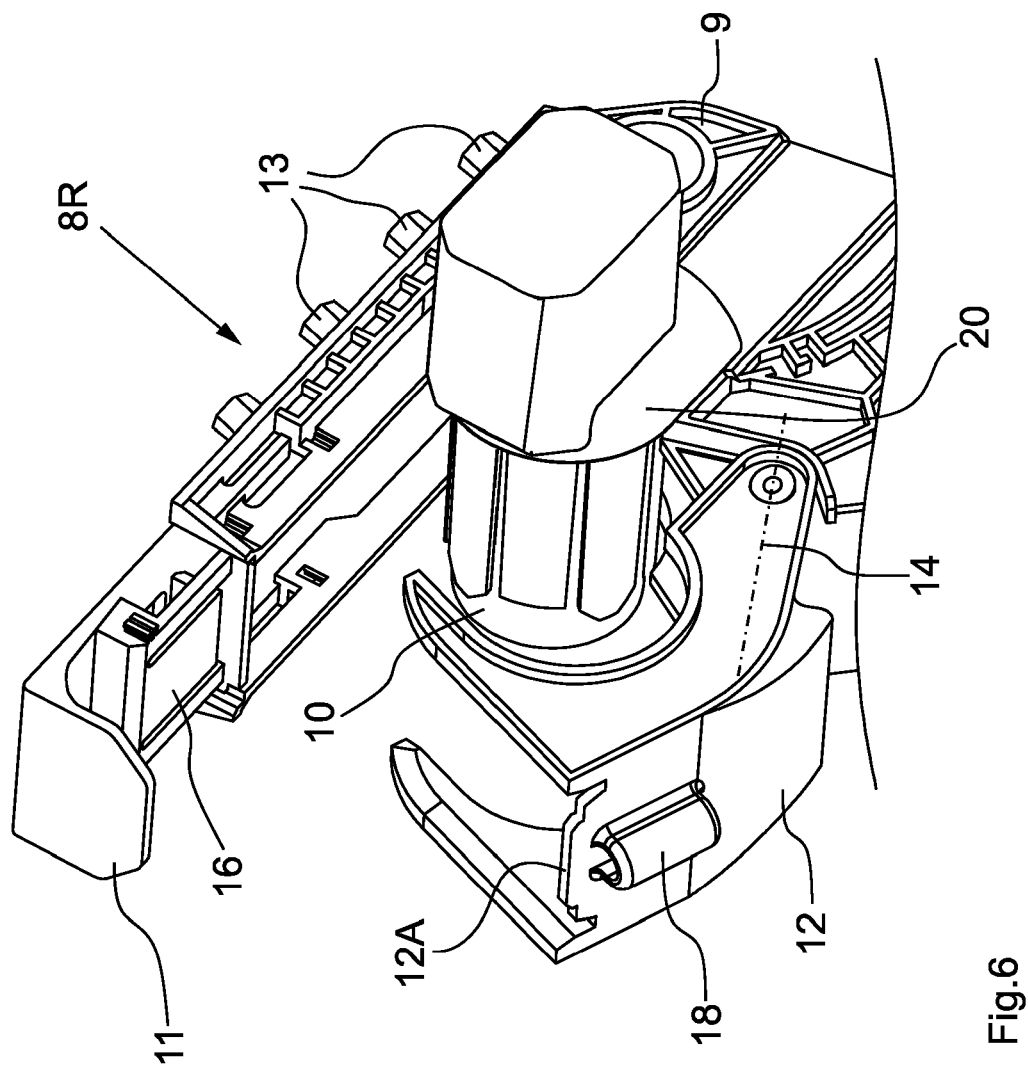
Figure 7:
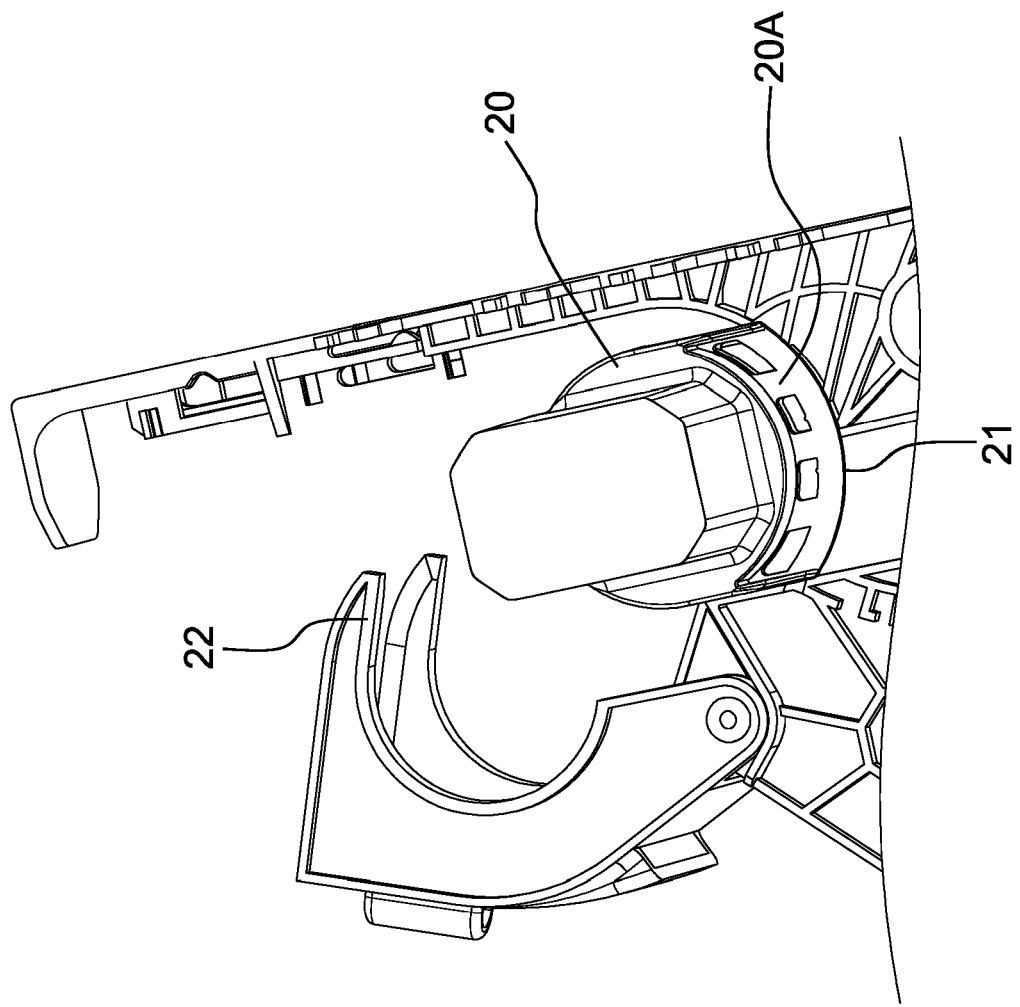
Figure 8:
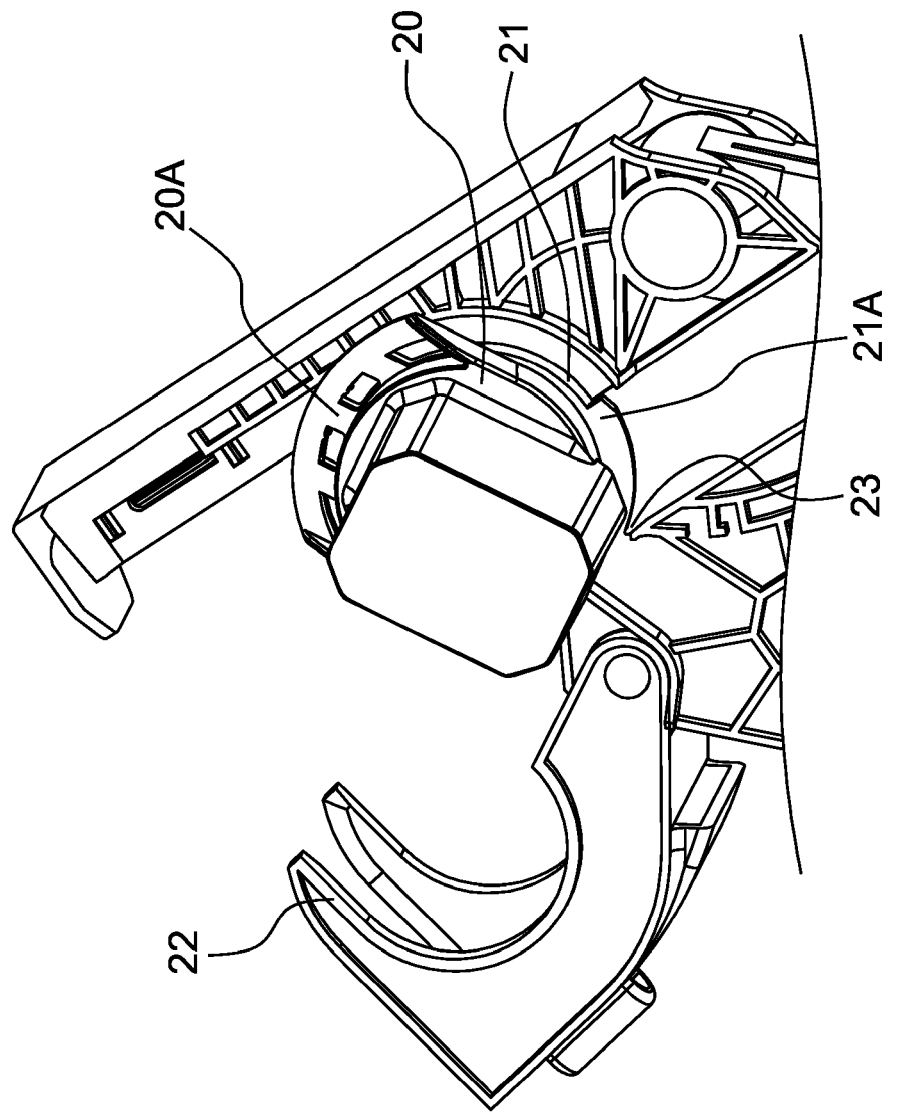
Figure 9:
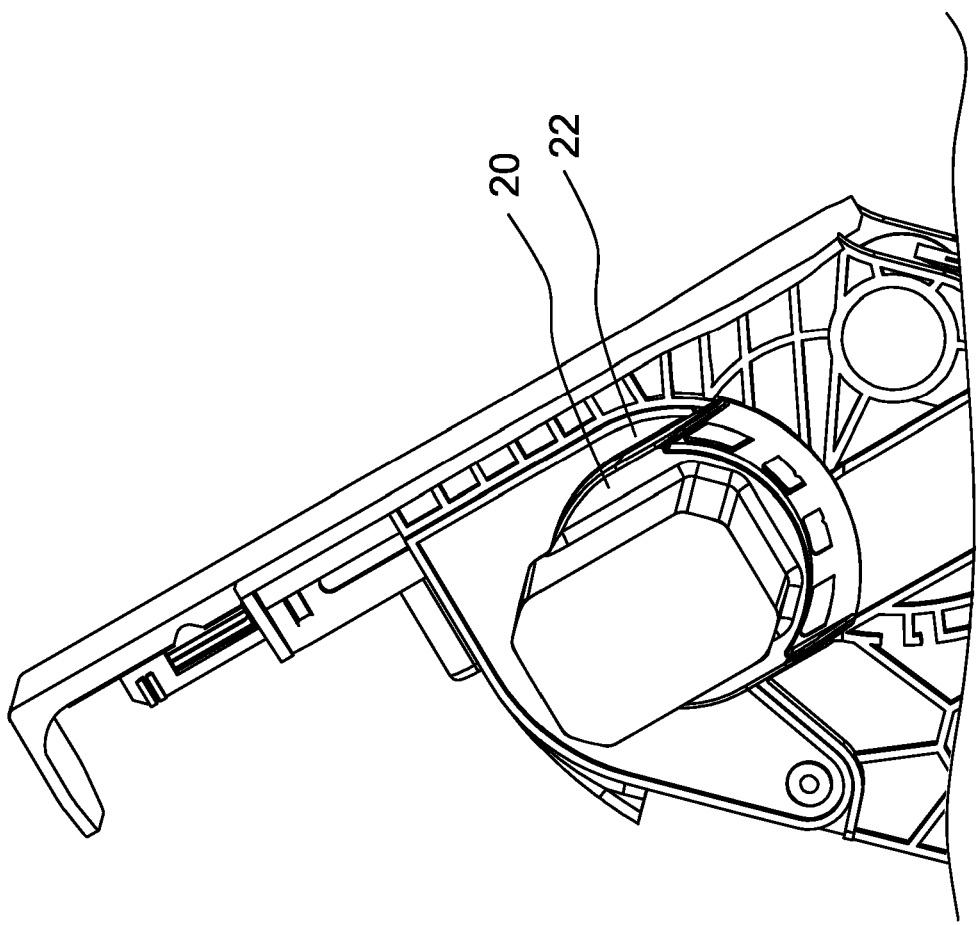

Further details of the present invention can be seen from the description of the examples and from the drawings. In the drawings FIG. 1 shows, in a perspective view, an agricultural distributing machine trailed behind an agricultural tractor, FIG. 2 shows, in a perspective view, a metering unit according to the present invention including a shut-off valve in a closed position, FIG. 3 shows, in a perspective view, the metering unit, the shut-off valve being in an open position, FIG. 4 shows, in a sectional view and detail view, the metering unit with a locking device, FIG. 5 shows, in a sectional view and detail view, the metering unit with the locking device unlocked, FIG. 6 shows, in a perspective view, the metering unit with a metering cover in an open position, FIG. 7 shows, in a side view, the metering unit with a bearing housing, FIG. 8 shows the metering unit in a side view, the bearing housing being at a removable position, and FIG. 9 shows the metering unit in a side view.

An agricultural distributing machine configured as a precision air seeder 1 is shown in FIG. 1. The precision air seeder 1 is trailed behind an agricultural tractor 2, so that the two machines can move together in operation over a field to be worked in the direction of travel F and distribute granular material, such as seed or fertilizer. The precision air seeder 1 comprises, at its rear end in the direction of travel F, a plurality of sowing units 3 arranged transversely to the direction of travel F. The sowing units 3 are fixed to the frame 1A of the precision air seeder 1, the frame 1A being adapted to be folded or telescoped to the permissible overall width for road haulage.

Each of the sowing units 3 is fixed to the frame 1A of the precision air seeder 1 by means of a respective mounting flange. In the upper area, the sowing units 3 have a first storage container 4, primarily for seed, and two second storage containers 5, primarily for granular material. In the lower area, which faces the ground, the sowing units 3 are provided with soil cultivation implements 6. The soil cultivation implements 6 serve to open a seed furrow and to close it again after seed and granular material have been delivered thereinto.

For the delivery of seed from the first storage container 4, the sowing units 3 each comprise a singling unit 7. The singling unit 7 is connected to the first storage container 4 on the one hand and to the soil cultivation implements 6 on the other, and it is configured for delivering singled seed into the seed furrow. For conveying granular material in adjustable quantities, the sowing units 3 each comprise two metering units 8. The respective metering units 8 are assigned to the second storage containers 5 and arranged at an outlet of the same. The granular material conveyed by the metering units 8 is also guided to the soil cultivation implements 6, where it is worked into the soil.

A metering unit 8 according to the present invention is shown in a perspective view in FIG. 2. The metering unit 8 essentially comprises a metering housing 9, a drivable metering wheel 10 arranged in the metering housing 9, a metering cover 12 and a displaceable shut-off valve 11, which is here closed in FIG. 2. The metering housing 9 can be arranged on a second storage container 5 via fastening hooks 13 on its rear side 8R. On the rear side 8R of the metering housing 9 there is an inlet, concealed here in FIG. 2, for granular material from the second storage container 5. This inlet is covered by the shut-off valve 11 when the shut-off valve 11 is closed, so that no granular material can flow into the metering housing 9. It follows that the shut-off valve 11 is shown in FIG. 2 at its closed position. In order to allow a flow of granular material into the metering housing 9, the shut-off valve 11 can be displaced, i.e. opened, as shown in FIG. 3, so that an opening cross-section of the inlet into the dosing housing 9 will be uncovered.

In order to allow a user to work on the inside of the metering housing 9, the metering cover 12 can be moved between different positions by means of a pivot joint having a pivot axis 14. In FIG. 2, the metering cover 12 is shown at a first position protecting the metering wheel 10, i.e. the metering housing 9 is closed. At this first closed position, the metering cover 12 has assigned thereto a locking device 15, which prevents the metering cover 12 from being moved unwantedly into a second position uncovering the metering wheel, as shown in FIG. 6.

The locking device 15 includes a locking element 16 that is adapted to be pushed away. The locking element 16 is configured to establish a releasable, form-fit connection according to the principle of a snap connection with the metering cover 12 and to thus secure the latter at its first position protecting the metering wheel 10. In order to release this form-fit connection and thus open the metering housing 9, the locking element 16 is adapted to be pushed away in the direction of the rear side 8R. For this purpose, the metering unit 8 comprises means, configured as a tool 17 with a corresponding insertion aid 18 arranged on the metering cover 12, for applying a push-away force. The insertion aid 18 defines a linear guide for the tool 17 in the actuation direction of the locking element 16, thus facilitating the application of the displacement force. In addition, the insertion aid 18 is arranged so close in front of the locking element 16 that the locking element 16 cannot be actuated by hand.

In FIG. 4, the locking device 15 is shown in a detail view and sectional view. The locking element 16 is in contact with a lug 12A of the metering cover 12, thus forming the form-fit connection. In the position shown, the lug 12A is lockingly engaged under the locking element 16. The shut-off valve 11, shown here in FIG. 4 at the closed position, is arranged in the direction of the rear side 8R behind the locking element 16. The shut-off valve 11 comprises a reception unit used for the locking element 16 and configured as a recess 19. If, making use of the tool 17, the push-in force is now applied to the locking element 16 so as to release the locking device 15, the locking element 16 will enter the recess 19 of the shut-off valve 11 under elastic deformation, as shown in FIG. 5. The form-fit connection between the locking element 16 and the lug 12A of the metering cover 12 is thus released and the metering cover 12 can be pivoted about the pivot axis 14 into its second position uncovering the metering wheel 10, as shown in FIG. 6. A prerequisite for allowing the locking element 16 to be pushed away into the recess 19 on the shut-off valve 11 is that the shut-off valve 11 is at its closed position.

FIG. 3 shows the shut-off valve 11 at its open position. At this position, the recess 19 is not located in the direction of the rear side 8R behind the locking element 16. If the user applied the push-away force to the locking element 16 by means of the tool 17 at this open position of the shut-off valve 11, it would not be possible to push the locking element 16 away under elastic deformation and, consequently, the locking device 15 could not be released. It follows that, on the basis of the recess 19, the shut-off valve 11 is configured to block the pushing away of the locking element 16 in its open position or to allow it in its closed position, as shown e.g. in FIGS. 4 and 5. The arrangement of the recess 19 on the shut-off valve 11 necessitates that the shut-off valve 11 must be closed so as to allow the locking element 15 to be released. Otherwise, the locking element 16 cannot be received in the recess 19 and hits against the shut-off valve 11 without releasing the lug 12A.

It follows that, for opening the metering unit 8, the user first has to close the shut-off valve 11. Then, with the aid of the tool 17, the push-in force can be applied to the locking element 16. For this purpose, the tool 17 has to be inserted into the insertion aid 18 and pushed in the direction of the locking element 16. As a result, the locking element 16 is pushed-in and the form-fit connection between the locking element 16 and the lug 12A on the metering cover 12 is released, so that the metering cover 12 can finally be moved. For moving the metering cover 12, the lug 12A on the metering cover 12 is pivoted out of the form-fit connection. In the course of this process, the metering cover 12 pivots down about the pivot axis 14 into its second position uncovering the metering wheel 10.

FIG. 6 shows the metering unit 8 in a perspective view with the metering cover 12 open. In the interior of the metering housing 9, the metering wheel 10 can be seen. For rotatably supporting the metering wheel 10, the metering unit 8 includes a removable bearing housing 20 with an approximately round cross-section. The bearing housing 20 comprises suitable means for supporting the metering wheel 10 and is insertable into a semicircular reception unit 21 on the metering housing 9, as shown in a side view in FIG. 7. In order to releasably secure the bearing housing 20 in position on the metering housing 9, the bearing housing 20 includes a groove-like recess 20A on its circumference. This groove-like recess 20A forms a slot and is thus adapted to engage behind a quarter-circular finger-shaped formation 21A on the reception unit 21.

The approximately octant-shaped formation 21A on the reception unit 21 can be seen in FIG. 8, in which the bearing housing 20 is shown in an unlocked position allowing removal from the metering housing 9. The bearing housing 20 can here be removed because the recess 20A is not in engagement with the formation 21A. The formation 21A forms an undercut, so that, when the recess 20A engages behind the formation 21A, the bearing housing 20 is at a locked position fixed in an axial direction and at least partially in a horizontal direction. This locked position of the bearing housing 20 is shown in FIG. 7, where, in contrast to the unlocked position shown in FIG. 8, the recess 20A engages behind the formation 21A.

For inserting the bearing housing 20 into the reception unit 21 and for securing it thus in position on the metering housing 9, i.e. for moving the bearing housing 20 from the unlocked position to the locked position, the bearing housing 20 has to be inserted into the reception unit 21. This means that the bearing housing 20 is positioned in the reception unit 21 in such a way that the recess 20A will be able to engage behind the formation 21A. Such positioning of the bearing housing is exemplarily shown in FIG. 8. Rotating of the bearing housing 20 up to a first stop 23 of the bearing housing will then have the effect that the recess 20A slides over the formation 21A and receives the latter therein and thus engages behind it, as shown in FIG. 7. At this position of the bearing housing 20, which is fixed to the metering housing 9, the recess 20A points at least approximately radially from the center axis of the bearing housing 20 in the direction of the base. In order to release the bearing housing 20 again, it will be necessary to rotate the bearing housing 20 in the reverse direction. This rotation in the reverse direction is blocked at the first position of the metering cover 12.

The metering cover 12 has a nose-piece-like extension 22, which, at the first position of the metering cover 12, defines an abutment for the bearing housing 20, as shown in FIG. 9. This ensures that the bearing housing 20 will not rotatably disengage unnoticed and unintentionally. In addition, the extension 22 thus forms a torque support for the bearing housing 20. Torques absorbed by the bearing housing 20 during operation will be transmitted via the extension 22 to the metering cover 12 and from there they will be dissipated via the metering housing 9 to surrounding structures. At the first position of the metering cover 12, the extension 22 additionally defines a second stop for the bearing housing 20 opposite the first stop 23, so that the bearing housing 20 is secured in position on the metering housing in a rotationally fixed manner between the first stop 23 and the extension 22. If the metering cover 12 is open, as shown in FIG. 8, the extension 22 does not define an abutment for the bearing housing 20, so that a rotation of the bearing housing 20 in a direction opposite to the direction in which the first stop 23 is located will be possible.

LIST OF REFERENCE NUMERALS 1 precision air seeder
1A frame
2 agricultural tractor
F direction of travel
3 sowing unit
4 first storage container
5 second storage container
6 soil cultivation implements
7 singling unit
8 metering unit
8R rear side
9 metering housing
10 metering wheel
11 shut-off valve 11
12 metering cover
12A lug
13 fastening hooks
13 pivot axis
14 locking device
15 locking element
17 tool
18 insertion aid
19 recess
20 bearing housing
20A recess
21 reception unit 21 A formation
22 extension
23 first stop

The invention claimed is:

1. A metering unit for granular material for conveying the granular material in adjustable quantities, wherein the metering unit comprises:
 a metering housing and a drivable metering wheel rotatably supported in the metering housing,
 wherein, for rotatably supporting the drivable metering wheel, the metering unit includes a bearing housing,
 the bearing housing comprises a locked position, at which the bearing housing is secured in position on the metering housing in an axial direction, and an unlocked position, at which the bearing housing is removable from the metering housing,
 the bearing housing is adapted to be rotated between the locked position and the unlocked position,
 the metering housing includes a metering cover which is movable to various positions,
 the metering cover comprises a first position protecting the drivable metering wheel and a second position uncovering the drivable metering wheel, and
 the metering cover includes a nose-piece extension, that, at the first position of the metering cover, the extension defines an abutment for the bearing housing and is adapted to block a rotary movement of the bearing housing from the locked position to the unlocked position.

2. The metering unit according to claim 1, wherein the metering housing comprises a first stop for limiting the rotary movement of the bearing housing from the unlocked position to the locked position, that, at the first position of the metering cover, the extension defines a second stop, which is located opposite the first stop, and the bearing housing is adapted to be secured in position on the metering housing in a rotationally fixed manner between the first stop and the second stop.

3. An agricultural distributing machine for distributing seed or fertilizer, wherein the agricultural distributing machine includes at least one storage container for the seed or the fertilizer, and the at least one storage container has assigned thereto the metering unit according to claim 1.

* * * * *